(12) United States Patent
Otto et al.

(10) Patent No.: US 7,521,522 B2
(45) Date of Patent: Apr. 21, 2009

(54) METHOD AND DEVICE TO REDUCE THE ACETALDEHYDE CONTENT OF POLYESTER GRANULATE

(75) Inventors: Brigitta Otto, Milow (DE); Rainer Linke, Butzbach (DE); Roland Schafer, Bad Homburg (DE); Holger Bachmann, Weiterstadt (DE)

(73) Assignee: Lurgi Zimmer GmbH, Frankfurt (DE)

( * ) Notice: Subject to any disclaimer, the term of this patent is extended or adjusted under 35 U.S.C. 154(b) by 143 days.

(21) Appl. No.: 11/509,854

(22) Filed: Aug. 25, 2006

(65) Prior Publication Data

US 2007/0073037 A1  Mar. 29, 2007

(30) Foreign Application Priority Data

Aug. 26, 2005  (DE) .................. 10 2005 040 668
Jun. 12, 2006  (DE) .................. 10 2006 027 176

(51) Int. Cl.
*C08G 63/00* (2006.01)
*C08G 63/02* (2006.01)

(52) U.S. Cl. ............... 528/272; 264/340; 428/35.7; 524/127; 524/183; 524/284; 524/503; 528/271; 528/486

(58) Field of Classification Search ............... 264/340; 428/35.7; 524/127, 183, 284, 503; 528/271, 528/272, 486
See application file for complete search history.

(56) References Cited

U.S. PATENT DOCUMENTS

| | | | |
|---|---|---|---|
| 3,617,225 A | 11/1971 | Kuehne et al. | |
| 3,959,209 A * | 5/1976 | Lake | 523/527 |
| 4,064,112 A | 12/1977 | Rothe et al. | |
| 4,161,578 A | 7/1979 | Herron | |
| 4,223,128 A | 9/1980 | Halek et al. | |
| 4,230,819 A | 10/1980 | Hauenstein et al. | |
| 4,259,478 A * | 3/1981 | Jackson et al. | 528/307 |
| 4,370,302 A | 1/1983 | Suzuoka et al. | |
| 4,436,782 A | 3/1984 | Ho | |
| 4,710,113 A | 12/1987 | Voigt | |
| 4,728,276 A | 3/1988 | Pauley et al. | |
| 4,740,390 A * | 4/1988 | Kulling | 427/213 |
| 5,292,865 A | 3/1994 | Kerpes et al. | |
| 5,573,820 A | 11/1996 | Harazoe et al. | |
| 5,663,290 A | 9/1997 | Heise et al. | |
| 6,084,055 A * | 7/2000 | Brunelle et al. | 528/272 |
| 6,686,405 B1 * | 2/2004 | Kawahara et al. | 524/127 |
| 2004/0236065 A1 * | 11/2004 | Denis et al. | 528/308.1 |
| 2005/0167876 A1 * | 8/2005 | Kreyenborg | 264/140 |
| 2007/0219341 A1 * | 9/2007 | Hally et al. | 528/272 |

FOREIGN PATENT DOCUMENTS

| | | |
|---|---|---|
| DE | 3541500 | 5/1987 |
| DE | 3702841 | 8/1987 |
| DE | 4314162 | 4/1994 |
| DE | 19505680 | 5/1996 |
| DE | 19503053 | 8/1996 |
| DE | 19914116 | 9/2000 |
| DE | 102004015515 | 9/2004 |
| DE | 10349016 | 6/2005 |
| DE | 102004010680 | 10/2005 |
| EP | 0222714 | 5/1987 |
| EP | 0320586 | 6/1989 |
| EP | 0432427 | 6/1991 |
| EP | 0842210 | 5/1998 |
| JP | 09249744 | 9/1997 |
| WO | WO 94/17122 | 8/1994 |
| WO | WO 97/05186 | 2/1997 |
| WO | WO 01/05566 | 1/2001 |
| WO | WO 01/81450 | 11/2001 |
| WO | WO 2005/044901 | 5/2005 |
| WO | WO 2005/085318 | 9/2005 |
| WO | WO 2005/092949 | 10/2005 |

* cited by examiner

*Primary Examiner*—Terressa M Boykin
(74) *Attorney, Agent, or Firm*—Michael Best & Friedrich LLP

(57) ABSTRACT

The invention relates to a method for producing a granulate with a low acetaldehyde content and improved processing properties from a high-viscosity polyester melt, wherein the polyester melt strand is fragmented under water at the highest possible temperature, the accompanying water is separated from the granulate with the least possible cooling of the granulate, the low-water granulate obtained in this way is passed after removal of the water directly into a dealdehydisation container and the granulate in the dealdehydisation container is treated with a flow of rinsing air, plus a device for carrying out this method.

30 Claims, 2 Drawing Sheets

Fig. 2a:

| 3.8 | 3.5 | 3.8 | | | |
|-----|-----|-----|--|--|--|
| 3.7 | 3.8 | 3.6 | | | |
| 4.7 | 3.5 | 3.7 | | | |
| 3.9 | 3.4 | 3.6 | | | |
| 4.1 | 3.6 | 3.5 | | | |
| 3.4 | 3.5 | 3.4 | | | |
| | | | | | |
| | | | | | |
| | | | | | |
| | | | | | |
| | | | | | |
| | | | | | |

Fig. 2b:

| 4.2 | 3.5 | 4.5 | | | |
|-----|-----|-----|--|--|--|
| 3.4 | 4.0 | 4.1 | | | |
| 3.9 | 4.4 | 4.4 | | | |
| 4.0 | 3.7 | 3.2 | | | |
| 4.0 | 4.6 | 4.8 | | | |
| 3.7 | 4.0 | 3.9 | | | |
| | | | | | |
| | | | | | |
| | | | | | |
| | | | | | |
| | | | | | |
| | | | | | |

FIGURE 2

METHOD AND DEVICE TO REDUCE THE ACETALDEHYDE CONTENT OF POLYESTER GRANULATE

This application claims the foreign priority under 35 U.S.C. § 119 of German Patent Application No. 102005040668.8 filed on Aug. 26, 2005 and German Patent Application No. 102006027176.9 filed on Jun. 12, 2006, each of which is hereby fully incorporated by reference.

The invention relates to a method and a device to reduce the acetaldehyde content of polyester granulate which is used preferably for the manufacture of polyester formed bodies.

STATE OF THE ART

The known aromatic polyesters or copolyesters, especially polyethylene terephthalate and its copolymers with low proportions of, for example, isophthalic acid or cyclohexanedimethanol, polybutylene terephthalate, polytrimethylene terephthalate, polyethylene naphthalate and their copolyesters, which are used as the base material for fibres, films, foils and packagings, are processed to medium-viscosity granulates after a melt polycondensation. The mean degree of polycondensation, expressed as the intrinsic viscosity (I.V.), is in the range of 0.30-0.90 dl/g in the case of polyethylene terephthalate and its correspondingly low-modified copolyesters after the melt polycondensation.

The expressions "granulate" and "chip" are intended to have the same meaning in the following and are therefore used synonymously.

Because it is almost impossible to produce granulates with an I.V. above 0.65 dl/g, especially in conventional autoclaves and high viscosities >0.80 dl/g require special reactors and, in addition, polyesters for food packaging require a very low acetaldehyde content, previously, according to the state of the art, melt polycondensation was followed by a solid state polycondensation (SSP) which leads to an increase in I.V. generally of 0.05-0.4 dl/g and a lowering of the acetaldehyde content from around 25-100 ppm to values <1 ppm in PET (polyethylene terephthalate).

In this solid state polycondensation which follows the melt polycondensation stage, the mean viscosity is increased in such a way that the strengths necessary for the corresponding area of application are reached, the acetaldehyde content is lowered in accordance with the requirements in the case of food packaging and the oligomer content arising is reduced to a minimum. It is important that, in addition, the acetaldehyde that is bound as vinyl ester, also called depot acetaldehyde, is broken down to the point that, in the processing of the polyester granulate into packaging, especially polyester bottles using the stretch blow and injection stretch blow forming methods, only a minimal quantity of acetaldehyde is formed again in the polyester. In particular, when mineral water is bottled in polyester bottles, the polyethylene terephthalate bottle wall should contain less than 2 ppm acetaldehyde, or preferably less than 1 ppm acetaldehyde.

In addition to SSP, methods for the de-aldehydisation of polyethylene terephthalate through treatment with nitrogen or dry air, as described in U.S. Pat. No. 4,230,819, are also known. In order to maintain the required low acetaldehyde content in the material, temperatures up to around 230° C. are used, whereas, at lower temperatures between 170 and 200° C., unsatisfyingly high acetaldehyde contents remain in the granulate. If air is used, a marked thermo-oxidative breakdown of the polyester is to be expected at such high temperatures. If nitrogen is used, extra costs are incurred for the gas and for the expensive purification.

In U.S. Pat. No. 4,223,128, temperatures above 220° are excluded if air is used as the carrier gas. The required increase in the I.V. is achieved using large quantities of dry air with a dew point of −40 to −80° C. At the treatment temperature of 200° C. described in the examples in this patent, the oxidative damage of individual granulate particles cannot be excluded in the case of continuous methods which have a more or less wide range of dwell times.

SSP produces a chain extension of the polyesters in the solid state, in order to minimise the secondary reactions which occur more frequently in a melt, and a removal of the harmful secondary products. With this chain extension, which is expressed as an increase in the I.V., it is possible to manufacture products such as bottles or tyre cords which require greater strength. Because polyesters are semi-crystalline thermoplastics, however, they have a larger or smaller amorphous portion, depending on type. This fact causes problems in carrying out SSP, since, at the temperatures required for SSP, the amorphous portions lead to conglutination which can even bring the production plant to a halt.

From this it is also known that, as a preliminary stage before SSP, a crystallisation of the semi-crystalline chips from the melt polycondensation can be carried out in a nitrogen or air atmosphere at temperatures between 160 and 210° C., to prevent the tendency to conglutination, as described in U.S. Pat. Nos. 4,064,112, 4,161,578 and 4,370,302.

In WO 94/17122, a 2-stage crystallisation with preheating and intermediate cooling before the SSP to avoid conglutination is disclosed. The SSP temperature described is between 205 and 230° C.

To improve the quality of the chips, it is possible, as described in JP 09249744 or U.S. Pat. No. 5,663,290, to work with damp inert gas before or during the SSP or, as disclosed in U.S. Pat. No. 5,573,820, the chips can be treated beforehand with hot water or directly with water vapour intensively at temperatures up to 200° C. before the crystallisation. In this case, however, a marked, unwanted drop in the I.V. is likely, as a result of hydrolysis in the PET, even at the normal temperatures of >190° C.

Another method is the treatment of the chips to be crystallised with purified undried nitrogen from the SSP in a counterflow in a 2nd crystallisation stage, as described in EP 222 714. The effect described there in reducing the acetaldehyde content is assessed as minor.

The companies processing these granulates are mainly manufacturers of hollow bodies. Frequently, pre-forming machines using the injection moulding method are used to manufacture preforms, from which, in a further stage, polyester bottles are produced in turn using a blow moulding method. Other uses of the polyester granulate, such as in machines for producing films and foils, are also possible.

In the meantime, methods for producing a polyester with the required viscosity have been developed which avoid an SSP. For example, DE 195 03 053 describes a method in which the melt emerging from the polycondensation reactor is mixed, in a line provided with static mixing elements, with an inert gas and a low-volatile amide compound which reduces the AA and is taken in the shortest possible time, with vacuum degassing, and with the least possible shearing of the melt, to a moulding device for the production of the preforms.

In DE 195 05 680, an inert gas is added to the polycondensation melt with an I.V.=0.5-0.75 dl/g, the melt is polycondensed in a post-condensation reactor in a vacuum to a viscosity of 0.75-0.95 dl/g and the melt is then forwarded immediately to an injection moulding tool.

EP 0 842 210 describes another possibility for avoiding SSP. Here, the melt polycondensation is carried out to a viscosity of 0.65-0.85 dl/g, the polyester is cooled and granulated, re-melted and then volatile substances such as AA are removed in a suitable device by rinsing with a suitable rinsing agent, with the formation of a large surface area.

If the polyester melt is not removed directly from a moulding unit, it is generally granulated in order to obtain an intermediate product that can be stored and transported.

The strand granulation method, for example, has been launched onto the market for the granulation of plastics. This method is characterised in that, in a continuous operation, relatively long plastic strands are pressed through a perforated plate and then passed through a water bath, hanging freely, after being transported for a short distance through air. Because of the low surface area of a plastic strand in comparison with the granulate, any water absorption can be kept within narrow limits. The cooled strands are dried and taken to a granulator. In this method, granulation is carried out in the solid state. After this, drying is normally carried out again, as described, for example, in DE 43 14 162 or in the Plastics Manual. If this granulating method is used, there is a major possibility of a marked isolated temperature increase in the strand and thus increased decomposition phenomena in the polymer and uneven degrees of crystallisation from chip to chip. With this technology, cooling in the chip takes place from the outside to the inside.

A further possibility for the granulation of polymer melt after polycondensation today is, in particular, underwater granulation, in which the melt is cut with cutting blades in a subsequent water chamber immediately after emerging from the granulator's nozzles/perforated plates. The cut granulates are still plastic and become deformed through the surface tension when quenched in cold water, with the cooling once again taking place from the outside to the inside; they take on an almost round or lens-type shape. The cooled granulates and the flow of water are passed through a water separator to separate the granulates, which are then dried and either packed in Big Bags or taken to silos for further processing (DE 35 41 500, DE 199 14 116, EP 0 432 427, DE 37 02 841). The chips made in this way have an even degree of crystallisation of less than 10%.

U.S. Pat. No. 4,436,782 describes in turn a method for the granulation and further processing of PET into pellets, in which, at temperatures between 260° C. and 280° C., an oligomer mixture with a viscosity of 0.08 to 0.15 is pressed through nozzles, creating drops which fall through a cooling zone with an inert gas atmosphere into a water bath or on a conveyor belt so that the drops solidify into amorphous pellets. This method also produces pellets with a high proportion of amorphous structures.

In all the methods described, granulates are obtained with a low degree of crystallisation, generally below 12%. In order to increase the crystallinity of the polymer granulates, for example as a preliminary stage for SSP, it is known that expensive reaction stages are required. High operating costs are caused, among other things, by the fact that the granulates arrive at ambient temperature and first have to be heated up to the crystallisation temperature.

WO 01/81450 describes a method and device for the drop generation of preliminary products for thermoplastic polyesters and copolyesters which overcomes the disadvantage of the granulating methods described above with regard to the crystallinity, which offers a shortening of traditional granulating methods and which builds on hitherto known steps and devices to produce drop-form pre-products in the form of monomers, oligomers, monomer-glycol mixtures or partly polycondensed materials. For this, the product is incorporated into a gaseous medium, whereby the gaseous medium, after the incorporation of the drop-form pre-product into the gaseous medium, accelerates the crystallisation process of the pre-product and brings about the crystallisation state faster by keeping the drop-form pre-product at a temperature >100° C. and below its melting point for a limited period of time, until a sufficient crystallisation in the surface of the drop has been completed. Here too, therefore, there is a more strongly crystallised outside layer. This produces a non-adhesive surface, which means that immediate further treatment to produce high-polymer polycondensate is possible. A material made in this way can only withstand the necessary mechanical stresses to a limited extent. Brittleness increases in comparison with an amorphous chip. A further disadvantage of this crystallinity generation in the low-molecular area is a chip that is completely crystallised right through after SSP has finished, with rigidly aligned crystal structures for the destruction of which disproportionately higher quantities of energy must be used during the melting process in the production, for example, of preforms using the injection moulding method. The high melting temperature of around 300° C. that is required causes the acetaldehyde reformation to increase markedly in the preforms and the quality deteriorates, particularly through the increased decomposition reactions. In addition, there is a risk that the progress of the SSP will be impeded or even stopped by the immobility of the chain ends when the viscosity increases.

A further granulating process for the production of crystallised chips during the granulation process is described in WO 01/05566. Liquid melted plastic strands emerging from nozzles are immediately semi-crystallised in a temperature-controlled liquid medium on a crystallisation line, whereby temperatures in this liquid medium are maintained above the glass transition temperature of the plastic strands. The crystallisation line is followed by the granulating device. The crystallisation in the shell of the plastic produces sufficient strength to be able to then divide the plastic strands into pellets after a short temperature-adjusting line in the granulating plant without any need for previous drying. Here too, there is therefore a more strongly crystallised outer layer. The disadvantage is that after the granulation of the plastics, there is a mixture of granulate and liquid medium, which means that the granulates must be dried using methods that are known.

German patent application DE 103 49 016 A1 and WO 2005/044901 A1 describe that, immediately after an underwater granulation, the pellets just produced are released very quickly from the water and dry and crystallise using their intrinsic warmth. In order to prevent conglutination of the chips, the pellets are transported, immediately after the water has been spun off, to a subsequent filling plant or further processing plant via a vibration or oscillation conveyor, after a sufficient dwell time. With this technology, the crystallisation process takes place from inside to outside in the pellet, using the intrinsic warmth, which means that crystallisation is more even across the diameter of the granulate.

The chips produced using this method can, according to DE 102004015515 A1, be further processed in a traditional plant for solid state dealdehydisation in order to reduce the acetaldehyde content to the required level. The chips, which are still at 140° C. after crystallisation, must be heated up to 210° C. for the solid state dealdehydisation. In this way, the acetaldehyde content in the chip can be reduced, for example, from 43 ppm to 0.9 ppm.

Disadvantages of DAH Methods to Date

The known methods for solid state dealdehydisation have a number of disadvantages. Firstly, several items of treatment equipment are necessary, namely, at least a granulator, a crystalliser, which may be two-stage if necessary, and a reactor in which the solid state dealdehydisation is carried out. In addition, devices for the further transport of the chips between the individual stages and temperature-adjusting devices to produce the temperatures in the chips needed for the various steps in the process are also required. Cooling and heating several times over also results in a high level of energy use on the part of the plant.

A further major disadvantage of the traditional methods lies in the fact that nitrogen, purified if necessary, is required as the treatment gas, which is expensive. It is required because, to heat the chips, the treatment gas is supplied at a temperature that is higher than the granulate temperature actually required during dealdehydisation, in order to transmit the heat from the gas to the chips. If, in this case, air were to be used as the treatment gas, the high temperatures would cause oxidative damage, resulting in an excessively high acetaldehyde content or an excessively high acetaldehyde reformation (i.e. subsequent formation of acetaldehyde).

OBJECT OF THE PRESENT INVENTION

The object of the present invention is therefore to provide a method that can be operated with simpler apparatus and with low operating costs and with which, at the same time, the particularly high quality standards for polyesters for packagings in terms of viscosity, colour, acetaldehyde content, acetaldehyde reformation and melt behaviour can be maintained or even improved. The mentioned disadvantages of the state of the art are to be avoided by this. In addition, the addition of acetaldehyde-reducing substances, known as "acetaldehyde scavengers", is to be avoided. In addition, the possibility should be created of influencing the intrinsic viscosity (I.V.) to a minor extent even after granulation in order, for example, to be able to produce small quantities of a granulate for special products without having to intervene in the operating conditions of the normally very large last melt polycondensation reactor before the granulator.

An additional object of the invention is to provide a device to carry out the method according to the invention.

A further object of the invention is to provide a polyester granulate with improved processing characteristics.

BRIEF DESCRIPTION OF THE INVENTION

The present invention provides a method according to claim 1. Preferred embodiments of this method are given in dependent claims 2 to 10 and in the following description. Furthermore, the present invention provides a device according to claim 11. Preferred embodiments are given in dependent claims 12 to 14 and in the following description. Furthermore, the present invention provides a polyester granulate as defined in claims 15 and 16. Preferred embodiments are given in turn in dependent claims 17 and 18 and in the following description.

BRIEF DESCRIPTION OF THE FIGURE

FIG. 2 discloses the acetaldehyde contents of preforms obtained with a 72-cavity tool.

DETAILED DESCRIPTION OF THE INVENTION

Figure 1:
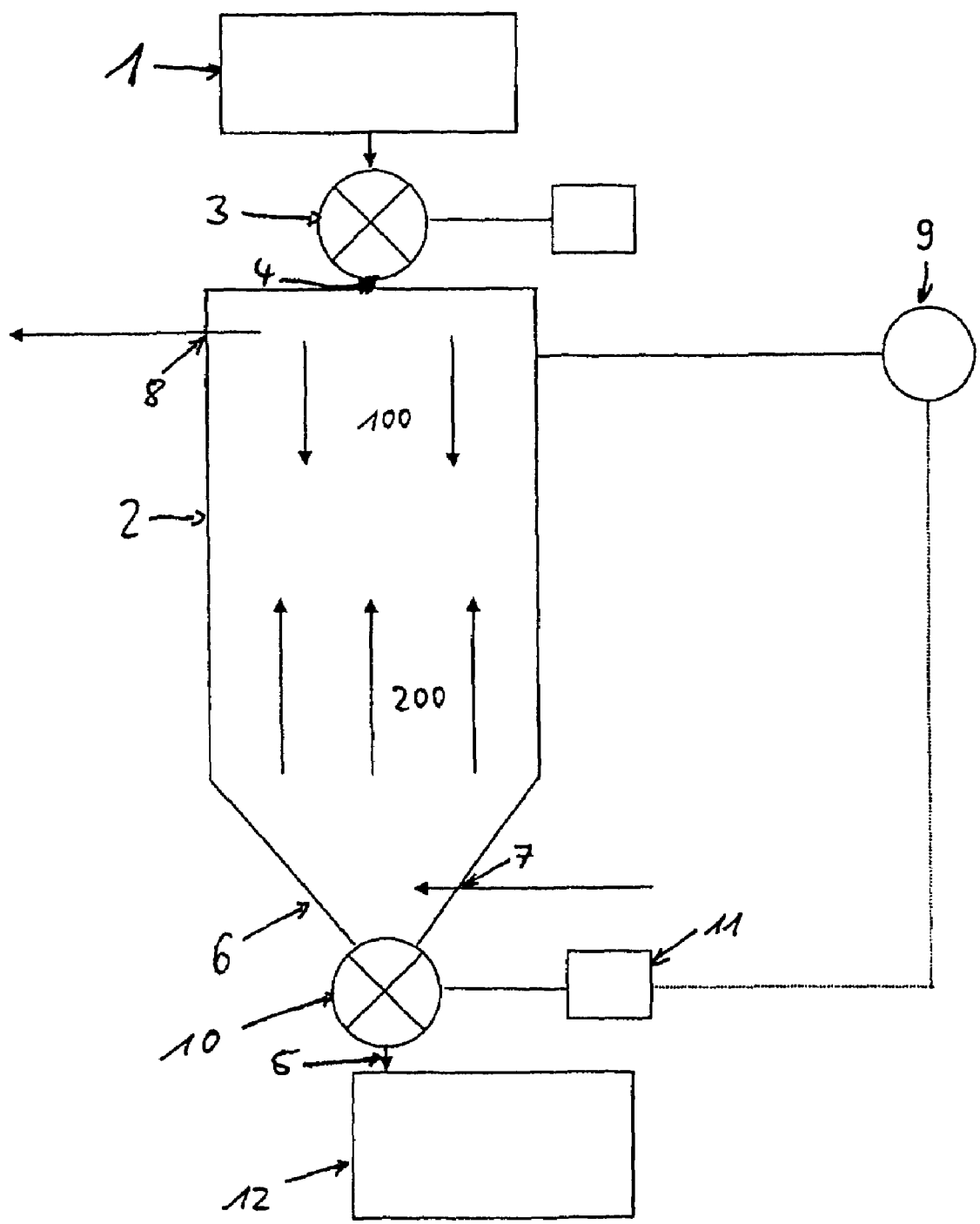
FIG. 1 shows diagrammatically a device in accordance with the present invention. It is described in detail in the following description.

The present invention provides a method for the production of a granulate with a low acetaldehyde content from a high-viscosity polyester melt with an I.V. between 0.60 and 1.0 dl/g, wherein a) the polyester melt strand is broken up under water at the highest possible temperature, b) the accompanying water is separated, preferably by spinning, from the granulate with the least possible cooling of the granulate, c) after removal of the water, the low-water granulate obtained in this way is placed in a dealdehydisation container, d) the granulate in the dealdehydisation container is treated using a flow of rinsing air with an intake temperature between 180° C. and 210° C., preferably between 180° C. and 200° C.

Preferably, the separation of the water from the granulate in step b) of the method in accordance with the present invention is by spinning, for which centrifuges in particular are suitable. Furthermore, it is preferred according to the invention if the granulate which is placed in the dealdehydisation container has a granulate temperature of 170 to 195° C. The dwell time of this granulate in the dealdehydisation container is preferably 3 to 20 hours. The granulate can, according to the invention, be placed directly into the dealdehydisation container after removal of the water (for example, using a merely passive feed device), or alternatively, a dosing device can be provided for forwarding, preferably a rotary vane feeder. In connection with the method according to the present invention, it is essential in this connection that, between the removal of the water and incorporation into the dealdehydisation container, no crystallisation stage needs to be carried out, even though this is regarded as essential in the state of the art.

The polyester is preferably polyethylene terephthalate and its copolymers with low proportions of comonomers such as isophthalic acid, diethylene glycol or cyclohexanedimethanol (CHDM). Preferably, the granulate produced according to the invention, however, contains no CHDM, since polyester containing CHDM has poorer barrier properties, for example, for carbon dioxide and bottles made from such material are less suitable for carbonated drinks. Polyester granulate containing CHDM also has a greater tendency to conglutination.

The polyester melt and thus also the granulate produced according to the invention does not contain any substances which reduce acetaldehyde.

In a preferred embodiment, the rinsing air can, in the method according to the invention, have a dew point Tp lower than 30° C., preferably lower than −15° C. and particularly preferably less than −20° C. Drying the rinsing air to dew points of −80° C. or even lower values no longer makes sense, from both a technical and a commercial viewpoint.

In a preferred embodiment, the intake temperature of the rinsing gas and the intake temperature of the granulate on entry into the DAH container should be as close as possible. The difference $(T_{S,E} - T_{G,E})$ between the granulate intake temperature $T_{G,E}$ and the intake temperature $T_{S,E}$ of the rinsing air should be between −10 and +40 K, preferably between 0 and 30 K.

In a preferred embodiment, in the method according to the invention, the difference between the intrinsic viscosity (I.V.) of the polyester between the entry into the dividing device in step a. and the exit from the dealdehydisation container in step d. should not exceed ±0.10 dl/g.

In a preferred embodiment, in the method according to the invention, the air should be dried before being passed into the dealdehydisation container using a molecular sieve or other absorbent agents.

The solution of the additional object is a device for producing a granulate with a low acetaldehyde content from a high-viscosity polyester melt, consisting of
  a) an underwater granulator,
  b) a centrifuge,
  c) a dealdehydisation container, which has on the top side at least a granulate intake opening and at least a rinsing gas outlet opening and on the bottom side a granulate outlet opening and on the bottom and/or top side at least a rinsing gas intake opening, whereby the granulate outlet of the centrifuge is linked with the granulate intake of the dealdehydisation container either only by a passive feed device or by a passive feed device in combination with a dosing device.

The term "dosing device" is also intended to cover all devices known to the person skilled in the art as "feeding device". In a preferred embodiment, in the device according to the invention, the dosing device can be a rotary vane feeder.

In a preferred embodiment, in the device according to the invention, the dealdehydisation container can contain devices inside.

In a preferred embodiment, in the device according to the invention, the dealdehydisation container can contain a stirring device.

The following describes the invention in detail. FIG. 1 serves as an explanation.

A high-viscosity polyester melt with the required I.V. can be produced in a polycondensation system which is, in itself, known. A polycondensation reactor for the production of high intrinsic viscosities ("HVSR") is used as the end reactor, as described, for example, in EP 0320586. This contains wipe-off elements for the continuous removal of melt which sticks to the stirring elements. Similarly, a so-called "double-drive" reactor (manufacturer: Zimmer AG), which is described, for example, in U.S. Pat. No. 3,617,225, is also suitable as the end reactor. This contains, instead of a continuous shaft a divided shaft, on which the stirring elements are positioned. The two half shafts are each moved by their own drives. This means that the speed can be matched to the reaction conditions, especially to the viscosity of the polymer melt, without any restriction. Any other polycondensation reactor that allows the production of the required intrinsic viscosities may also be used.

The polyester melt with the required I.V. is taken out of the end reactor via corresponding melt pipes directly to an underwater granulating device 1 in which the melt strand is cut with the least possible cooling. The temperature of the melt strand on entry into the granulator 1 should, for PET, be between 270 and 290° C. and preferably 280-285° C. The underwater granulation produces a spherical granulate. Granulators which are suitable for this include, for example, those obtainable from the manufacturers BKG, Gala Industries and Rieter.

For the underwater granulation in accordance with the present invention, the water preferably has a temperature of at least 90° C., preferably more than 90° C. to 98° C., and particularly preferably 95° C. to 98° C. The underwater granulation is carried out without any additional application of pressure, since in accordance with the present invention an underwater granulation is carried out at water temperatures below the boiling point.

In order, as described below, to prevent excessive cooling of the polyester material in this stage of the method, the dwell time of the polyester material in the underwater granulation should preferably be kept as short as possible, for example 30 seconds or less, or more preferably 15 seconds or less, or even more preferably 5 seconds or less, and in particular from 1 to 0.1 seconds.

The granulate is taken through the flow of water to a device in which water and granulate are separated from each other as far as possible, whereby the contact time between the water and the granulate must be minimised. A centrifuge is particularly suitable for this. The choice of suitable centrifuges is possible for the person skilled in the art without any problem if such person is familiar with the present invention.

It is essential for the feasibility of the present invention that the devices and process stages described so far are carried out in such a way that the granulate coming out of the centrifuge has a temperature of at least 130° C., preferably more than 140° C. and particularly preferably at least 170° C. Cooling should therefore be kept to a minimum. This is achieved primarily through the use of hot water in the underwater granulator. In order not to cool the polyester too much, the water temperature should be at least 90° C. and preferably >95° C. To limit evaporation losses, a water temperature of 98° C. should not be exceeded.

The granulate, from which most of the water has been removed is then passed directly into a DAH container 2. In the most favourable case, the granulate simply falls out of the centrifuge through gravity directly into the DAH container. Depending on its temperature, the granulate still has a water content after centrifuging of 200 to 2000 ppm. FIG. 1 does not show the centrifuge separately, since it is absolutely essential if an underwater granulator is used.

In order to achieve a controlled continuous supply, a dosing device 3 can be inserted between the centrifuge and the DAH container 2. The dosing device 3 must be designed in such a way that the granulate is not cooled to any great extent and that the outflow of rinsing air via the granulate infeed is prevented. It may, for example, be thermally insulated against the surrounding area and/or heated. The dosing device 3 is preferably a rotary vane feed. Alternatively, for example, slide valves and/or double pendulum valves may be used, which briefly build up the granulate in the granulator discharge and then open at regular intervals in order to allow the granulate to fall into the DAH container 2.

The DAH container 2 is preferably an upright cylindrical container with an intake 4 for the granulate on the top side and an outlet 5 for the dealdehydised granulate on the underside. The underside is preferably made as a conical floor 6 in order to ensure an even product flow. The DAH container may have static inserted devices to improve its mechanical stability, to support the static pressure of the column of granulate, to even out the product flow and/or to forward the rinsing air. Furthermore, it may contain stirring devices to move the granulate. In the lower area, the DAH container may have devices, such as cooling pipes, cooling plates or similar to cool the granulate.

In addition, the DAH container contains at least one rinsing gas intake opening 7 and at least one rinsing gas outlet opening 8, which are arranged in such a way that the rinsing gas necessary for dealdehydisation can be passed in uniflow or counterflow through the DAH container to the granulate. Preferably, and as shown in FIG. 1, this gas intake is in the conical floor in order to achieve the longest possible contact time between the granulate 100 and the rinsing gas 200. If an internal granulate cooler is used, the rinsing gas intake is above the granulate cooler. If several intake openings are provided, these may be positioned in a ring shape, for example, in order to ensure even distribution of the gas.

In order to ensure an even temperature distribution in the DAH container, rinsing gas intake openings 7 can be arranged at several levels in the DAH container. For example, a first line of intake openings 7 can be positioned in a ring shape in the conical floor as shown in FIG. 1, whilst a second line of intake openings (not shown in FIG. 1) are located in another ring half way between the granulate intake and the granulate outlet. Preferably, the rinsing gas intake openings are located on at least two levels. A maximum of five levels may prove to be sensible. The rinsing gas can leave the DAH container at the top through a separate gas outlet 8.

It may prove sensible to pass the rinsing gas in uniflow instead of counterflow through the DAH container to the granulate. In this case, the at least one rinsing gas intake must be arranged on the top side and the at least one rinsing gas outlet on the underside of the DAH container. Once again, arrangement on several levels is possible.

The DAH container should be designed in such a way that the dwell time of the granulate in its dealdehydisation part is between 3 and 20 hours, preferably between 8 and 14 hours and particularly preferably between 10 and 14 hours.

The DAH container may have a temperature control device, for example a double casing, which allows heat to be supplied to or be removed from the reactor content.

The DAH container also has a level metering device 9. At the granulate outlet, there is a rotary vane feeder 10 with drive unit 11 for discharging the dealdehydised granulate. The filling level of the DAH container is controlled using the discharge rotary vane feeder 10 with drive unit 11.

If there is no internal cooling provided in the DAH container, after the discharge rotary vane feeder 10, the granulate falls into a granulate cooler 12 and from there into a silo or directly into a sack or Big Bag.

Any gas known for this purpose, such as nitrogen or dried air, can be used as the rinsing gas. For economic reasons, however, air is preferably used which can be taken out of the atmosphere. Before passing into the DAH container, this is dried to the point that it has a dew point lower than 30° C., preferably lower than −15° C. and particularly preferably lower than −20° C. Drying is carried out preferably using the generally known methods, e.g. using a molecular sieve or other suitable absorbent agents.

The rise or drop in the intrinsic viscosity occurring in the method according to the invention can be influenced by the dew point set for drying, i.e. the water content of the rinsing gas. Details in this respect are given in DE 102004010680 A1.

The air-chip ratio is preferably 4:1 to 0.1:1 (m:m); this means that in a unit of time, between 4 and 0.1 kg air are added per 1 kg granulate entering the container 2. The range from 1:1 to 0.3:1 (m:m) is particularly preferred. Larger quantities of air require unnecessarily large fans, pipes, drying devices and similar devices and an unnecessarily high level of energy and are therefore not economical.

The air that is used can be taken partly or wholly in a cycle. In this case, the air that has already been used must be treated before entering the container 2 again. For this, acetaldehyde and surplus water are removed by means of adsorption using a molecular sieve or similar substances and methods known to the person skilled in the art. Acetaldehyde decomposes largely into water and carbon dioxide at the gas temperatures applied according to the invention.

The rinsing gas is heated before entry into the DAH container to a defined temperature which can be between 180 and 200° C. Outside this temperature range, it is no longer possible to carry out the method according to the invention in a way that is economical and beneficial.

The product temperature of the granulate in the DAH container should be between 170 and 195° C. For economical dealdehydisation, the intake temperature of the rinsing gas and the intake temperature of the granulate on entry into the DAH container should be as close as possible. The difference $(T_{S,E} - T_{G,E})$ between the granulate intake temperature $T_{G,E}$ and the intake temperature $T_{S,E}$ of the rinsing air should be between −10 and +40 K, preferably between 0 and 30 K.

This is possible because the granulate already enters the DAH container 2 from the centrifuge at the described high temperature. In the DAH container, in addition to the dealdehydisation, for which energy must be used, a crystallisation of the polyester chains in the granulate takes place at the same time, which prevents conglutination of the granulate. This crystallisation releases thermal energy. Surprisingly, it has been found that these processes overlap in the given process conditions in such a way that considerably less additional thermal energy has to be supplied via the rinsing gas.

Similarly surprisingly, it has been found that the granulate, despite its high temperature on entry into the DAH container, does not conglutinate although it has a comparatively low degree of crystallisation when it enters the DAH container. When it leaves the DAH container, the dealdehydised granulate also shows no conglutination, even though the degree of crystallisation is low at this point in comparison with the known state of the art.

A particular advantage of the present invention is thus that there is no need for normal crystallisation stages in the production of the polyester granulate, so that the entire time needed for the method is much shorter and the equipment is much simpler.

Because the hot rinsing gas flows from the bottom upwards through the entire granulate column, it also dries the granulate in the top-most layer in the container 2, which has a water content of up to 2000 ppm after centrifuging. During dealdehydisation, drying of the granulate is continued until water content values of 30 ppm are reached.

The polyester granulate produced with the method according to the invention has very positive properties for its further use. Because of the use of the method described, the intrinsic viscosity (I.V.) of the polyester only changes a little between entry into the dividing device in step a. and exit from the dealdehydisation container in step d, controlled as a function of the product temperature, the dwell time, the dew point and the temperature of the rinsing gas and the size of the chips. If the settings in the DAH container are optimum, the input I.V. is the same as the output I.V. If necessary, the I.V. can be raised or lowered in the DAH container via the dew point of the rinsing gas.

The method according to the invention produces an acetaldehyde content of <1 ppm, so that the granulate can be used without any problems, for example, for the production of food packaging. Surprisingly, the granulate can be processed in the moulding devices used for this, such as injection moulding machines for the production of bottle preforms, at comparatively low temperatures of maximum 275° C., preferably even max. 255° C. The lower limit of processability is, according to experience, about 250° C. These low temperatures in combination with the conditions of the method according to the invention result in the fact that the polyester only shows maximum 0 to 2 ppm acetaldehyde reformation (newly formed acetaldehyde) during the course of further use. It is therefore even possible to start preform production with granulate made according to the invention with a higher AA content, e.g. up to 3 ppm and thus to produce a preform that does not have more than 3 ppm AA.

The granulates made in this way have a very uniform core-shell structure. The spheroliths are large and continuously distributed across the cross-section of the granulate. There are no major I.V. differences across the cross-section and no fixed shell structure in comparison with standard SSP chips which are made using the traditional method.

The degree of crystallisation in the chips is very evenly distributed and, on exit from the DAH container, is less than 52%, preferably below 48%; the HOF (heat of fusion) as a measure of the energy required to melt the chips is less than 50 kJ/kg.

The most important characteristics of the polyester granulate produced by the method according to the invention can be summarised as follows:

The polyester granulate according to the invention with a degree of crystallisation <52%, preferably <48%, and a heat of fusion (HOF) <50 kJ/kg can be further processed into bottle preforms at a barrel temperature of max. 275° C., preferably max. 255° C. and at least around 250° C.

The polyester granulate according to the invention with a degree of crystallisation <52%, preferably <48%, and a heat of fusion (HOF) <50 kJ/kg has, in further processing into bottle preforms at a barrel temperature of max. 275° C. and min. around 250° C., an acetaldehyde reformation of 0 to 8 ppm, preferably max. 0 to 2 ppm.

The polyester granulate according to the invention shows no conglutination, irrespective of the degree of crystallisation.

EXAMPLES

The invention will now be described in more detail by means of embodiments which in no way restrict the invention. The given characteristic values have been determined as follows:

The intrinsic viscosity (I.V.) was measured at 25° C. in a solution of 500 mg polyester in 100 ml of a mixture of phenol and 1 2-dichlorobenzol (3:2 parts by weight).

Measurement of the colour values L and b was carried out according to HUNTER. The polyester chips were first crystallised in the drying cabinet at 135±5° C. for an hour. The colour values were then determined by measuring, in a three-range colour measuring device, the colour of the polyester sample with three photo cells each preceded by a red, green or blue filter (X, Y and Z values). The evaluation was carried out according to Hunter's formula, in which $$L = 10\sqrt{Y} \text{ and}$$
$$b = \frac{7.0}{\sqrt{Y(Y - 0.8467\ Z)}}.$$

The acetaldehyde content (AA) was determined by driving the acetaldehyde out of the polyester through heating in an enclosed container and determining the acetaldehyde in the gas area of the container by gas chromatography using Perkin Elmer's H540 head-space injection system (carrier gas: nitrogen; column: 1.5 m stainless steel; filling: Poropack Q, 80-100 mesh; sample quantity: 2 g; heating temperature: 150° C.; heating time: 90 min).

To determine the degree of crystallisation α (=KTG), the density ρ of 30 chips was determined three times in a density gradient with a tetrachlorethane/heptane mixture at 23° C. and α calculated according to the following formula:

$$\alpha = \frac{Pc(P - Pa)}{P(Pc - Pa)}$$

in which
the density of 100% crystalline PET: pc=1.455 and
the density of amorphous PET: pa=1.332.

The melt enthalpy ("heat of fusion", HOF) was determined in a Mettler DSC device in accordance with ASTM E 793 issued by the American Society for Testing of Materials with a heating rate of 50 K/min from 100 to 200° C., 5 min kept at this temperature and then with a heating rate of 10 K/min to 300° C.; the energy used was determined in kJ/kg.

All examples were carried out with spherical to lenticular granulate with an average mass of 17 mg/chip. The polyester from the last melt polycondensation reactor (DHI) had the following comonomer composition: comonomers: 2% mass isophthalic acid (IPA); 1.4% mass diethylene glycol (DEG). The catalyst content was 210 ppm Sb, the cobalt proportion was 10 ppm and the stabiliser content was 15 ppm P.

The most important results from the examples described are shown in the following Tables 1 and 2.

Example 1 (Comparative Example)

In the comparative example, amorphous chips with a standard I.V. from the melt polycondensation process for the manufacture of slightly modified PET for the bottling of sweet drinks were crystallised and subjected to solid state polycondensation.

For this, chips were produced in a traditional underwater granulator, type AH 2000 made by BKG, with the temperature of the water cycle set at approx. 80° C. by means of water cooling. The pressure in the water system adjusted to atmospheric pressure in the centrifuge. The dwell time of the polyester material in the water granulator was 44 seconds; the temperature of the chips on exit from the centrifuge was 70 to 80° C. The chips had the following characteristics:

I.V.=0.61 dl/g; AA content=40 ppm; KTG=8%. In a first crystallisation stage, a fluidised bed crystalliser with a dwell time of 60 min and a temperature of 200° C., chips were obtained with the following characteristics: I.V.=0.62 dl/g; AA content=12.3 ppm; KTG=46.1%. In a second crystallisation stage, a shaft crystalliser with a dwell time of 180 min and a temperature of 215° C., the following qualities were obtained: I.V.=0.63 dl/g; AA content=8.3 ppm; KTG=53.1%. These chips were then conveyed to a standard SSP reactor and subjected to solid state polycondensation at a temperature of 207.5° C. for a dwell time of 12 hours. In all three stages, nitrogen with a dew point (Tp) of −50° C. was used as the carrier gas. The gas:chip ratio (m:m) was 1:1.

In example 1, a two-stage crystallisation treatment was therefore carried out after the underwater granulation—a treatment that is not necessary according to the invention.

Example 2 (Comparative Example)

In comparative example 2, highly condensed chips with an I.V.=0.74 dl/g and an AA content=51 ppm were granulated and crystallised using the latent heat crystallisation method with a BKG CrystallCut® system including a vibration channel. A KTG of 41% was produced; the chips obtained in this way were further processed. The parameters for the CrystallCut® system were as follows: water cycle uncooled, water temperature 90 to 95° C., dwell time of the polyester material in the water approx. 0.6 hours, chip temperature at exit from centrifuge 150 to 160° C., dwell time on the crystallisation channel 12 minutes. The two further crystallisation stages used in example 1 were not carried out. The granulate exiting from the crystallisation channel at 140° C. was conveyed via a suitable conveyor device without intermediate storage or interim cooling directly into a DAH container (rinsing gas: nitrogen with Tp=−30° C.). The temperature in the solid state dealdehydisation stage was 213° C. with a dwell time of 6.7 hours.

Also in example 2, a crystallisation treatment is carried out after granulation which, as described in example 2, is both time-consuming and also requires a large quantity of equipment.

Examples 3, 4 and 6

The two crystallisation stages were omitted and no use was made of a crystallisation channel as used in examples 1 and 2. The pressure in the granulator's water system corresponded to the atmospheric pressure in the centrifuge. The granulator's water cycle was uncooled, the water temperature was 90 to 95° C., the dwell time of the polyester material in the water was 0.4 seconds. The outlet of the granulator's drying device (centrifuge) was installed according to the invention directly over the DAH container so that the semi-crystalline, hot granulate could be dosed at temperatures of at least 175° C. directly via a rotary vane feed into the container directly underneath it. The KTG at the intake to the DAH container varied considerably, fluctuating between 2 and 38%, and the AA content was 49 to 53 ppm.

The DAH container was operated with hot air >175° C. and a dew point (TP) between 0° C. and −50° C. and with a gas:chip ratio (m:m) of 4:1 to 0.7:1 in a counterflow. The hot rinsing air was blown in in the conical part of the DAH container by means of a ring-shaped distributor, and left the container again above the maximum filling level. The dwell time of the chips was 12 to 14 hours. The flow rate was 40 kg/h. In the series of tests, which were carried out continuously, it was found that there was no measurable or visible dust either in the continuously arising exhaust air flows or in the DAH container when it was emptied at the end of the trial.

Example 3

Chips with a temperature of 175° C. were conveyed via a rotary vane feeder directly into the DAH container. The rinsing air, which moved in a counterflow, had a temperature of 200° C. and a dew point (Tp) of 0° C. The gas:chip ratio (m:m) was 4:1. The dwell time of the chips was 14 hours. The AA level in the exhaust air was 0.05 ppm with 100% exchange, i.e. without recirculation.

Example 4

Chips with a temperature of 190° C. were conveyed via a rotary vane feeder directly into the DAH container. The rinsing air, which moved in a counterflow, had a temperature of 190° C. and a dew point (Tp) of −50° C. The gas:chip ratio (m:m) was 0.7:1. The dwell time of the chips was 12 hours. The AA level in the exhaust air was 0.1 ppm with 70% exclusion, i.e. 30% of the air was passed back into circulation.

Example 5 (Comparative Example)

The SSP PET material used for the example 6 according to the invention as a comparison was obtained from the market, analysed and processed in the preforming machine.

Example 6

For the test in example 6, a PET melt with an I.V. of 0.77 dl/g was taken to the granulating system. In this example, no dosing device was used and the hot chips, which were crystallised to a very low degree (KTG approx. 2%) fell freely directly into the DAH container. In this test, the chips in the down pipe were removed for analysis and cooled immediately in liquid nitrogen to freeze their current state. The mean temperature in the DAH container was 180° C. The rinsing air, which was supplied in a counterflow, had a temperature of 205° C. and its dew point was −20° C. The gas:chip ratio was 0.7:1 (m:m).

Example 7

The test was carried out as in example 6, i.e. without a dosing device, but with a gas:chip ratio of 0.3:1 (m:m). The dew point of the rinsing air was −28° C.

TABLE 1

|  |  | Example 1 | Example 2 | Example 3 | Example 4 | Example 5 | Example 6 | Example 7 |
|---|---|---|---|---|---|---|---|---|
| Starting material | IV [dl/g] | 0.63 | 0.74 | 0.74 | 0.74 | — | 0.77 | 0.775 |
|  | KTG [%] | 53 | 41 | 38 | 38 | — | 2 | 5 |
|  | AA [ppm] | 8.3 | 51 | 53 | 53 | — | 49 | 47.5 |
|  | Colour b | −2.0 | −2.0 | −2.0 | −2.0 | — | −0.2 | 0 |
| Further processing conditions |  | Standard SSP | Solid state DAH with $N_2$ | DAH with air | DAH with air | Standard SSP | DAH with air | DAH with air |
|  | Dwell time [h] | 12 | 6.7 | 14 | 12 | — | 12 | 12 |
|  | Tprod [° C.] | 207 | 210 | 175 | 180 | — | 180 | 185 |
|  | Gas | Nitrogen | Nitrogen | Air | Air | — | Air | Air |
|  | Tp [° C.] | −50 | −30 | 0 | −50 | — | −20 | −28 |
|  | Gas:chip [m:m] | 0.7:1 | 1:1 | 4:1 | 0.7:1 | — | 0.7:1 | 0.3:1 |
|  | Δ I.V. [dl/g] | 0.18 | 0.06 | 0 | 0.06 | — | 0.04 | 0.05 |
| End product | I.V. [dl/g] | 0.80 | 0.80 | 0.74 | 0.80 | 0.81 | 0.81 | 0.825 |
|  | AA [ppm] | 0.8 | 0.9 | 2.8 | 0.8 | 0.8 | 0.9 | 0.6 |
|  | KTG (degree of cryst.) | 56 | 50 | 44 | 46 | 58 | 47 | 48 |

TABLE 1-continued

|  | Example 1 | Example 2 | Example 3 | Example 4 | Example 5 | Example 6 | Example 7 |
|---|---|---|---|---|---|---|---|
| HOF (heat of fusion) kJ/kg] | 59 | 52 | 39 | 40 | 59 | 42 | 44 |
| Colour b | −1.5 | −1.1 | −1.5 | −0.5 | −2 | +0.5 | +1.5 |

The suitability for processing of the granulates obtained in this way was tested in a Husky HL 160 preforming machine (2-cavity tool, preform weight 31 g for 1 l bottles), with the lowest possible temperature of the melting unit, i.e. the extruder ("barrel temperature") being taken as the criterion for evaluation. A further criterion is the cycle time, i.e. the total time required to produce a preform in the cavity tool from ejection of a preform to the ejection of the following preform.

It was possible to process the material in examples 3, 4, 6 and 7 without problems at a barrel temperature of both 275° C. and 255° C. The granulate used in example 2 could be processed into preforms at 255° C. However, the preforms were not clear at the base. On the other hand, the granulate from example 1 could only be processed at a barrel temperature of 260° C. At 255° C., the granulate from example 1 could not be melted fast enough. The granulate from example 5 could actually only be processed at a barrel temperature of 275° C. Table 2 shows the processing conditions and the associated analysis results for the preforms obtained from these processing tests. The materials in the comparative examples are thus not as suitable for processing into a preform as the materials obtained in accordance with the present invention.

form production were overall at a far better level than in the case of the traditional SSP chips in example 5.

This shows clearly that the granulate which can be produced in the method according to the invention, which is more easily melted, also has crucial advantages in further processing as far as the acetaldehyde content in the preform is concerned: the possible lower melting temperature means that less acetaldehyde is formed in the preform.

At the same time, the lower barrel temperatures mean that energy can be saved in the preforming machines. The most important physical bottle values were measured on the 1 l bottles produced from these preforms. These were in accordance with the market requirements.

The greater suitability for processing of the granulates made according to the invention was also seen in processing tests with a commercial preforming machine (Husky HyPET 300 P100/120 E140, with 72-cavity tool, preform weight 26 g): granulates were processed which had been produced in accordance with examples 1 (comparison) and 6. The acetaldehyde contents of all the preforms from the top left quarter of the tool, which has 72 preform positions in total, were measured and entered in FIG. 2 in the corresponding boxes. The figure in each box corresponds to the acetaldehyde content in [ppm] of the preform made in this position. It can be seen that,

TABLE 2

|  | Example 1 | Example 2 | Example 3 | Example 4 | Example 5 | Example 6 | Example 7 |
|---|---|---|---|---|---|---|---|
| Barrel temp. [° C.] | 255 | 255 | 255 | 255 | 255 | 255 | 265 |
| Cycle time [sec] | 12.5 | 12.5 | 12.5 | 12.5 | 15.0 | 15.0 | 15.0 |
| Δ AA [ppm] | n.p. | n.p. | 0.2 | 0.5 | n.p. | 1.4 | 1.3 |
| Δ I.V. [dl/g] | n.p. | n.p. | −0.010 | −0.015 | n.p. | −0.010 | −0.02 |
| Barrel temp. [° C.] | 260 | 260 | — | — | — | — | — |
| Cycle time [sec] | 12.5 | 12.5 | — | — | — | — | — |
| Δ AA [ppm] | 1.4 | 0.6 | — | — | — | — | — |
| Δ I.V. [dl/g] | −0.02 | −0.015 | — | — | — | — | — |
| Barrel temp. [° C.] | 275 | 275 | 275 | 275 | 275 | 275 | 275 |
| Cycle time [sec] | 12.5 | 12.5 | 12.5 | 12.5 | 15.0 | 15.0 | 15.0 |
| Δ AA [ppm] | 1.7 | 1.2 | 0.5 | 1.4 | 4.5 | 2.1 | 1.7 |
| Δ I.V. [dl/g] | −0.035 | −0.020 | −0.020 | −0.022 | 0.050 | −0.040 | −0.035 | n.p. = processing not possible
\* = processing possible but preforms cloudy
Δ AA = acetaldehyde reformation during preform production
Δ I.V. = change in viscosity during preform production In example 3, at a barrel temperature of 255° C. in the preforming machine the acetaldehyde reformation value, at +0.2 ppm, was only slightly above the initial AA value; the decrease in viscosity was very low, at −0.01 dl/g. When the mean product temperature was increased, the dealdehydisation effect was much better. At the same time, the viscosity increased noticeably with the use of dry air. The degree of crystallisation and HOF increased, but were still well below the values for standard chips (see example 1). The lowering of the gas:chip ratio only had a minor influence.

The chips produced according to the invention from example 6 were easily processed overall. The acetaldehyde reformation value and the decrease in viscosity during prein the processing of the granulate made according to the invention from example 6, the acetaldehyde concentration in the preform was both lower overall and also more uniform (see FIG. 2a) than was the case with the granulate made traditionally from comparative example 1 (FIG. 2b). This clearly indicates a better, i.e. more even, flow behaviour of the melt from the granulate made according to the invention.

The invention claimed is:

1. Method for producing a granulate with a low acetaldehyde content from a high-viscosity polyester melt with an I.V. between 0.60 and 1.0 dl/g, comprising
   a) fragmenting the polyester melt strand under water at the highest possible temperature, b) separating the accompanying water from the granulate with the least possible cooling of the granulate, c) passing the low-water granulate obtained in this way into a dealdehydization container after the water has been removed, and d) treating the granulate in the dealdehydization container using a flow of rinsing air with an intake temperature between 180° C. and 200° C. such that dealdehydization and crystallization of the granulate occurs.

2. Method according to claim 1, wherein the rinsing air has a dew point Tp less than 30° C.

3. Method according to claim 1, wherein the air-granulate ratio in the dealdehydization container is 4:1 to 0.1:1.

4. Method according to claim 1, wherein the difference between the granulate intake temperature and the intake temperature of the rinsing air is between −10 and +40 K.

5. Method according to claim 1, wherein the difference in the intrinsic viscosity (I.V.) of the polyester between entry into the fragmentation device in step a) and exit from the dealdehydization container in step d) is maximum +0.10 dl/g.

6. Method according to claim 5, wherein the intrinsic viscosity of the product is adjusted by adjusting the dew point Tp of the rinsing air and the product temperature.

7. Method according to claim 1, wherein the water is separated from the granulate in step b) by spinning.

8. Method according to claim 1, wherein the granulate in step d) has a temperature of 170 to 195° C.

9. Method according to claim 1, wherein the dwell time of the granulate in the dealdehydization container in step d) is between 3 and 20 hours.

10. Method according to claim 1, wherein the granulate in step c) is either passed directly into the dealdehydization container or passed into the dealdehydization container by means of a dosing device.

11. Device for the production of a granulate with a low acetaldehyde content from a high-viscosity polyester melt comprising a) an underwater granulator, b) a centrifuge, c) a dealdehydization container which has at least a granulate intake opening on the top side and a granulate outlet opening on the underside and at least one rinsing gas intake opening and at least one rinsing gas outlet opening, wherein the granulate outlet of the centrifuge is connected with the granulate intake of the dealdehydization container either by a passive feed device or a passive feed device in combination with a dosing device.

12. Device according to claim 11, wherein the dosing device comprises a rotary vane feeder.

13. Device according to claim 11, wherein the dealdehydization container contains devices inside.

14. Device according to claim 11, wherein the dealdehydization container contains a stirring device.

15. Polyester granulate, produced according to a method according to claim 1, with a degree of crystallization of <52%, and a heat of fusion (HOF) <50 kJ/kg, wherein the granulate can be further processed to bottle preforms at a barrel temperature of maximum 275° C.

16. Polyester granulate, produced according to a method according to claim 1, with a degree of crystallization of <52%, and a heat of fusion (HOF) <50 kJ/kg, wherein when reprocessed to bottle preforms at a barrel temperature of maximum 275C., the bottle preforms have an acetaldehyde reformation of maximum 0 to 8 ppm.

17. Polyester granulate according to claim 15, wherein the polyester granulate contains no cyclohexanedimethanol comonomers.

18. Polyester granulate according to claim 15 which shows no conglutination irrespective of the degree of crystallisation.

19. Method according to claim 1, wherein the rinsing air has a dew point Tp less than −15° C.

20. Method according to claim 1, wherein the rinsing air has a dew point Tp less than −20° C.

21. Method according to claim 1, wherein the air-granulate ratio in the dealdehydization container is 0.7:1 to 0.3:1.

22. Method according to claim 1, wherein the difference between the granulate intake temperature and the intake temperature of the rinsing air is between 0 and 30 K.

23. Method according to claim 10, wherein the dosing device comprises a rotary vane feeder.

24. Granulate of claim 15, wherein the degree of crystallization is <48%.

25. Granulate of claim 15, wherein the barrel temperature is a maximum of 255° C.

26. Granulate of claim 16, wherein the degree of crystallization is <48%.

27. Granulate of claim 16, wherein the acetaldehyde reformation is a maximum of 0 to 2 ppm.

28. The method of claim 1, wherein the polyester melt strand of step a) is fragmented under water at a temperature of 90° C. to 98° C.

29. The granulate of claim 15, wherein the degree of crystallization in the granulate is evenly distributed.

30. The granulate of claim 16, wherein the degree of crystallization in the granulate is evenly distributed.

* * * * *